P. MONTUCCHIARO.
WHEEL HUB.
APPLICATION FILED NOV. 15, 1916.
1,295,350.
Patented Feb. 25, 1919.
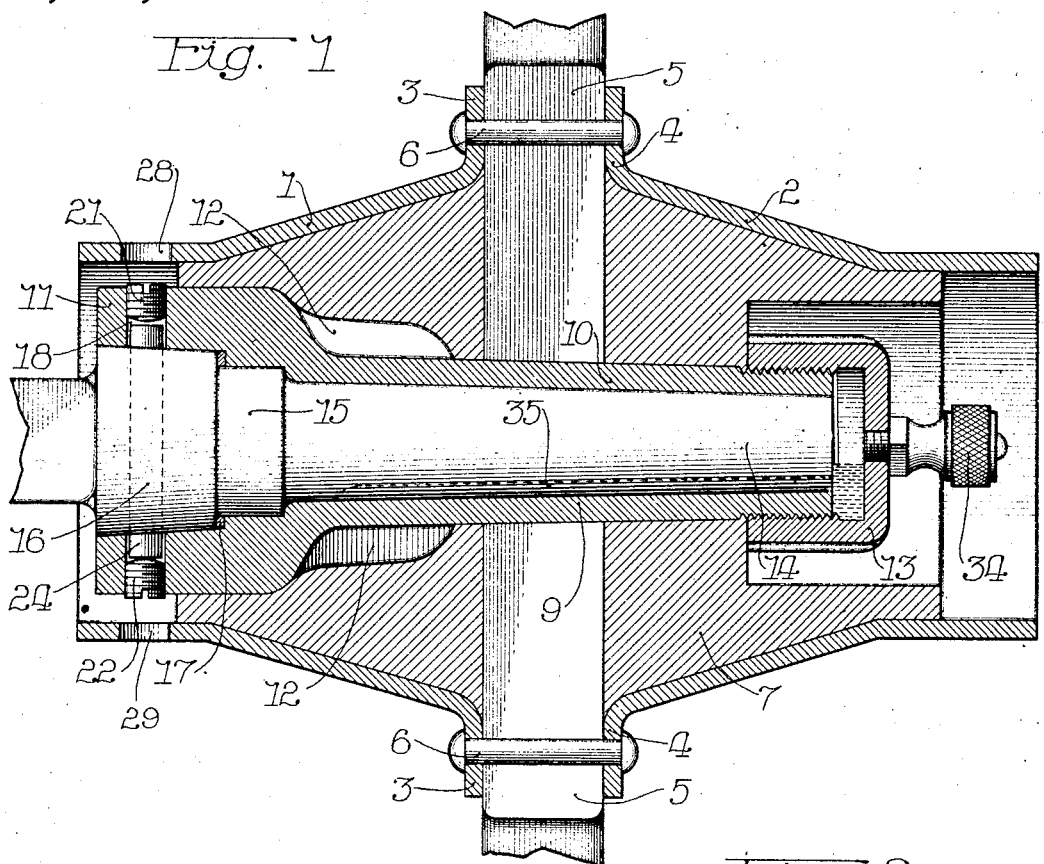
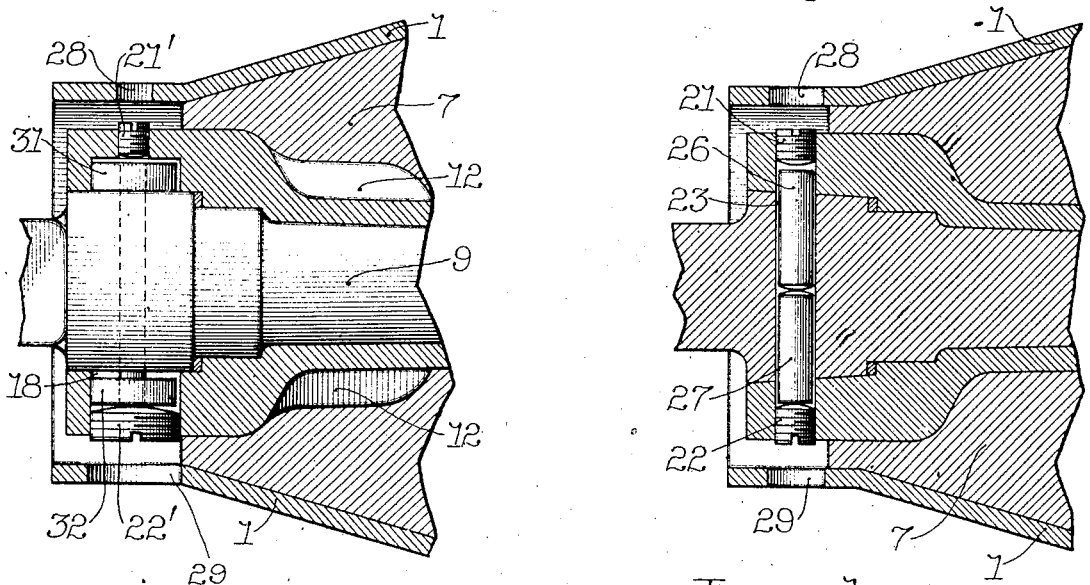
Inventor
Peter Montucchiaro
By Brown, Hanson & Boettcher
Attorneys

UNITED STATES PATENT OFFICE.

PETER MONTUCCHIARO, OF CHICAGO HEIGHTS, ILLINOIS.

WHEEL-HUB.

1,295,350.

Specification of Letters Patent. Patented Feb. 25, 1919.

Application filed November 15, 1916. Serial No. 131,360.

*To all whom it may concern:*

Be it known that I, PETER MONTUCCHIARO, a citizen of the United States, residing at Chicago Heights, in the county of Cook and State of Illinois, have invented a certain new and useful Improvement in Wheel-Hubs, of which the following is a full, clear, concise, and exact description, reference being had to the accompanying drawings, forming a part of this specification.

My invention relates to wheel hubs.

More particularly my invention relates to hubs dispensing with the usual axle nut. I provide substitutional locking means for retaining the wheel upon the spindle which is superior to the customary axle nut in strength, simplicity and lack of friction and which obviates the attendant troubles of the axle nut such as possibility of loss, entry of dirt, difficulty of lubrication and the like.

The subject matter of this application is related to the subject matter of my copending application Serial Number 127,082 filed October 23, 1916. The prior application also pertains to a nutless wheel hub and upon which the present application is intended to improve in features of simplicity and inexpensive construction.

In the drawing—

Figure 1 is a sectional view of a hub embodying my invention.

Fig. 2 is a fragmentary section of a modified form of my invention; and

Fig. 3 is a fragmentary section of another modified form of my invention.

The hub comprises a pair of tapering shells 1 and 2 disposed on the inner and outer faces of the wheel respectively. Similar flanges 3 and 4 on the shells embrace the ends of the spokes 5 and have rivets 6, 6 extending therebetween through the abutting faces of adjacent spokes. Within the shells 1 and 2 is the filler or core 7, preferably of wood, which has radial slots therein for receiving the inner ends of the spokes 5, in accordance with a practice well known in the art.

The assembled hub is bored out for the reception of the axle box 9 which consists of the tapering sleeve portion 10 and the enlarged end portion 11 shown at the left in Fig. 1. Extending longitudinally from the enlarged portion 11 are two or more feathers or splines 12, 12, integral with the axle box 9, which become embedded in the fibrous core 7 when the axle box is drawn into the hub. An end cap 13 threads upon the extremity of the sleeve portion 10 and by threading this cap up into firm engagement with the core, the axle box is drawn into the core, where it is rigidly held against any relative movement by, the resulting wedging action between the enlarged portion 11 and the core, and the splined engagement between the splines 12, 12 and the core.

The spindle 14 is tapered similar to the axle box 9 and has integrally formed on its inner end two collars 15 and 16. A leather washer 17 is provided between the larger collar 16 and the adjacent shoulder in the axle box to prevent the entry of dirt and grit to the spindle bearing from the inner end of the hub and also to prevent the leakage of lubricant from the spindle bearing past the collar 16.

An internal annular groove 18 is formed in the face of the bore in the enlarged portion 11 and this groove is tapped by two diametrically opposite radial holes normally closed off by the screws 21 and 22. A hole 23, see Fig. 2, is drilled diametrically through the collar 16 in the same vertical plane with the internal groove 18 and is of a diameter slightly smaller than the width of the groove. A locking pin 24 is inserted in this latter hole, which has projecting ends that engage with the sides of the internal groove and prevent the longitudinal displacement of the hub upon the spindle. The insertion of this pin is made by removing one of the screws 21 or 22, revolving the axle box until the open hole is alined with the hole 23 through the collar 16, inserting the pin and then replacing the screw. In this specific form of my invention I contemplate having the pin 24 fit tightly within the diametrical hole 23, as by a taper fit, so that it will have sliding and not rolling engagement with the sides of the internal groove. The removal of the pin is facilitated by the provision of the two screw-plugged holes, through one of which the pin can be forcibly ejected by a tool inserted through the other.

In Fig. 2 I have shown a modification wherein I contemplate having the locking pin revolubly mounted in the collar 16. In this adaptation the diametrical hole through the collar 16 is made slightly larger than the diameter of the pin, as shown in exaggeration, and the pin is bisected at its center.

The two pins 26 and 27 are required because the turning moments applied to their outer extremities by the revolving axle box are in opposite directions.

In Fig. 2 I have provided opposite openings 28 and 29 in the inner shell 1 alined with the screws 21 and 22 through which the latter may be inserted or removed together with the locking pins, thus obviating the necessity of first separating the axle box from the hub before gaining access to these screws. These openings are especially advantageous where the wheel is to be removed frequently.

In Fig. 3 I have supplemented the revoluble feature of Fig. 2 by providing rollers 31 and 32, which afford more extensive surface for engagement with the sides of the internal groove. The internal groove is necessarily widened to accommodate their greater width. The pin, which in this instance acts as a pivot for the rollers, may be mounted in the collar 16 either rigidly or revolubly as previously explained. The insertion of this pin is effected through the removal of the screw 21' and the insertion of the rollers is effected through the removal of the screw 22'.

Where subjected to severe usage, it may be preferable to aline the internal groove 18 and the diametrical hole 23 so that the pins or rollers can bear only on the left side of the groove, as illustrated in Fig. 3, to receive the single thrust acting therebetween. When so constructed the inwardly-acting thrust would be taken up by the taper of the spindle 14 and collar 16 and by the abutting shoulders on the spindle and in the axle box. In Fig. 3 the collar 16 is cylindrical to provide a straight seating surface for the rollers.

The strength of the spindle is not impaired by the diametrical hole therethrough, as the enlarged collar 16 provides ample reinforcement therefor.

Referring to Fig. 1, the end cap 13 is internally threaded but part way, the remaining portion serving as a reservoir for lubricant which is injected through the oil cup 34, threaded into the outer face of the end cap 13. During rotation of the hub the body of oil has constant access to the longitudinal groove 35 in the spindle 14, thereby providing a constant feed of lubricant to the spindle bearing. The end cap 13 closes off the outer end of the axle box thereby preventing the entry of dirt and foreign matter to the spindle bearing.

What I claim is:

1. In combination, an axle box having a groove therein and having a radial hole alined with said groove, a screw normally closing said radial hole, a spindle in said axle box, and a freely turnable pin through said spindle having its ends engaging in said groove.

2. In combination, an axle box having an internal groove therein and having a radial hole alined with the groove, means normally closing said radial hole, a spindle in said axle box, and two alined pins freely turnable in said spindle and having their outer ends in said groove.

3. In combination, an axle box having an annular groove therein and having a radial hole alined with the groove, means normally closing said hole, a spindle in said box and anti-friction members carried by the spindle and held against rotation with the box, said members projecting into said groove.

4. In a wheel hub, an axle box having an annular groove therein and having a radial hole alined with said groove, a screw normally closing said radial hole, a spindle in said axle box, locking means on said spindle engaging in said groove, an outer shell inclosing said axle box and fixed thereon independent of said screw, said outer shell having an opening therethrough alined with said radial hole and said screw.

5. In combination, an axle housing having an annular groove therein, a spindle in the housing, support means in the spindle radially projecting into the groove, anti-friction means carried by first said means, the housing having openings therein adapted to aline with said support means, and removable plugs in said openings to permit removal of said support means.

In witness whereof, I hereunto subscribe my name this 13th day of November, A. D. 1916.

PETER MONTUCCHIARO.